United States Patent
Mecca

[11] Patent Number: 5,995,481
[45] Date of Patent: Nov. 30, 1999

[54] LIGHT-READABLE RECORDING DISC UTILIZING HALF-WAVELENGTH PITS OR BUMPS AND SYSTEM FOR READING SUCH DISCS

[75] Inventor: Charles M. J. Mecca, Jessup, Pa.

[73] Assignee: WEA Manufacturing Inc., Olyphant, Pa.

[21] Appl. No.: 08/527,158

[22] Filed: Sep. 12, 1995

[51] Int. Cl.[6] .................................. G11B 3/70; G11B 7/00
[52] U.S. Cl. .................... 369/275.4; 369/109; 369/275.5
[58] Field of Search .............................. 369/275.1, 275.2, 369/275.3, 275.4, 275.5, 109, 44.26, 59, 100

[56] References Cited

U.S. PATENT DOCUMENTS

| | | | |
|---|---|---|---|
| 3,430,966 | 3/1969 | Gregg | 274/42 |
| 3,687,664 | 8/1972 | Broadbent | 96/35.1 |
| 3,833,769 | 9/1974 | Compaan et al. | 179/100.3 |
| 3,838,401 | 9/1974 | Graf et al. | 340/173 LM |
| 3,855,426 | 12/1974 | Bouwhuis | 179/100.3 V |
| 3,956,582 | 5/1976 | Bouwhuis | 178/6.6 R |
| 3,999,008 | 12/1976 | Bouwhuis et al. | 358/128 |
| 3,999,009 | 12/1976 | Bouwhuis | 358/128 |
| 4,041,530 | 8/1977 | Kramer et al. | 358/128 |
| 4,161,752 | 7/1979 | Basilico | 369/275.3 |
| 4,491,940 | 1/1985 | Tinet | 364/46 |
| 4,819,223 | 4/1989 | Gregg | 369/275 |
| 4,856,108 | 8/1989 | Tinet | 369/46 |
| 4,868,808 | 9/1989 | Tinet | 369/275 |
| 4,893,297 | 1/1990 | Gregg | 369/275 |
| 4,961,183 | 10/1990 | Tinet | 369/275.4 |
| 4,963,464 | 10/1990 | Setani . | |
| 4,965,153 | 10/1990 | Imataki et al. . | |
| 4,989,193 | 1/1991 | Tinet | 369/44.26 |
| 5,003,526 | 3/1991 | Bailey | 369/59 |
| 5,016,235 | 5/1991 | Tinet | 369/44.41 |
| 5,068,846 | 11/1991 | Kramer | 369/275.1 |
| 5,084,852 | 1/1972 | Bailey | 369/59 |
| 5,132,952 | 1/1992 | Tinet | 369/44.26 |
| 5,144,552 | 9/1992 | Abe | 369/275.4 |
| 5,175,725 | 12/1992 | Tinet | 369/275.4 |
| 5,182,743 | 1/1993 | Tinet | 369/275.4 |
| 5,321,680 | 6/1994 | Bailey | 369/59 |

FOREIGN PATENT DOCUMENTS

| | | | |
|---|---|---|---|
| 0 461 956 A1 | 12/1991 | European Pat. Off. | G11B 7/00 |
| 0 517 490 A2 | 12/1992 | European Pat. Off. | G11B 7/24 |
| 2 710 443 A1 | 3/1995 | France | G11B 7/08 |
| 60-117430 | 6/1985 | Japan | G11B 7/24 |
| 60-157740 | 8/1985 | Japan | G11B 7/24 |
| 7-029214 | 1/1995 | Japan | G11B 7/26 |

OTHER PUBLICATIONS

Pohlmann, *The Compact Disc Handbook*, 2d edition, A–R Editions, Inc., Madison, Wisconsin, 1992, ch. 3.

van Slageren, *The Philips CD Mastering Process*, "Basics on Compact Disc, A Short Introduction," Nederlandse Philips Bedrijven B.V., Eindhoven, The Netherlands, circa 1984, pp. 17–20.

*Primary Examiner*—Paul W. Huber
*Attorney, Agent, or Firm*—Robert R. Jackson; Jeffrey H. Ingerman; Fish & Neave

[57] ABSTRACT

An improved light-readable information recording disc is provided in which the optical data storage structure consists of either lands and pits or lands and bumps, in which the depth of the pits or the height of the bumps, respectively, is controlled to approximate one-half of the wavelength of the light striking the optical data storage structure. Unexpected and surprising improvements over conventional optical recording discs is achieved through increased light intensity differences detected at the changeover between pits/bumps and lands.

34 Claims, 1 Drawing Sheet

LIGHT-READABLE RECORDING DISC UTILIZING HALF-WAVELENGTH PITS OR BUMPS AND SYSTEM FOR READING SUCH DISCS

BACKGROUND OF THE INVENTION

This invention relates to information recording media in the form of light-readable discs, and, more particularly, to an improved design for such media which, among other benefits, will tolerate greater error in the manufacturing process and permit the use of less expensive optical reading equipment.

Such light-readable information recording media in the form of discs are well known, as shown, for example, in Kramer U.S. Pat. No. 5,068,846.

Commercially available audio compact discs ("CDs") and compact disc read-only memories ("CD-ROMs") are examples of recording media of this general type. Recent interest has also been shown in using media of this type for recording other kinds of information, such as movies or other similar real-time audio/visual programming.

Storage of such information in digital form requires enormous capacity. In addition to the storage of data itself, the recording medium must also provide for error correction, synchronization and modulation of the stored data.

For example, in general commercial use, standard disc-shaped audio recording media are designed to be approximately 120 millimeters in diameter. A center hole approximately 15 millimeters in diameter is provided to accommodate the shaft of the player spindle around which the disc rotates. As a result, the area immediately adjacent the center hole must be utilized as a clamping area, and can hold no data. Space for data is therefore limited.

Because such a large amount of data must be stored in such a small area, the details of the optical storage structure must be extremely small. This leads not only to extremely tight manufacturing tolerances but also requires sensitive optical reading devices.

In cross-section, the disc-shaped, light-readable recording medium in general commercial use is approximately 1.2 millimeters thick. Although any transparent material may be used to form the predominant portion of the medium, polycarbonate plastic with a refractive index of 1.55 is typically used. Data are contained in a pit and land structure impressed along the top surface of this transparent material. This structure is covered by a very thin, adherent, metal reflective layer which is conductive in nature, typically aluminum, of approximately 70 nanometers thickness. Atop this is placed a protective layer of approximately 10 to 30 micrometers, typically lacquer, which fills the pit indentations in the reflective layer and provides a smooth, substantially planar upper surface for the medium upon which labelling or other information may be placed.

The optical structure of the medium is read by a laser beam which is configured below the medium, in typical use operating at a wavelength of 780 nanometers in air and focussed at the reflective layer. The laser beam passes through the bottom of the transparent material and through the optical structure of pits and lands (which is seen by the laser from below as a series of bumps and lands), and is reflected off the reflective layer, through the transparent material and out of the medium to an optical reading structure.

It is generally accepted that the means by which the data are read (and, hence, the means by which the difference between bumps and lands is seen by the optical reader) is through utilization of destructive interference caused by diffraction effects. This has led to the standardization of pit depth/bump height (depending upon the plane of reference) in commercial light-readable information recording media at just less than approximately one-quarter of the wavelength of the laser light within the transparent material. Light from a laser operating at 780 nanometers would have a wavelength within the polycarbonate material of the media (R.I.= 1.55) of approximately 503 nanometers. For tracking reasons well known to those skilled in the art, pit depth/bump height has been standardized at just less than a perfect one-quarter wavelength, or 126 nanometers. This is reflected in the recommendation of Philips, the assignee of the Kramer patent, that the compact disc pit depth/bump height be maintained at approximately 0.12 microns.

The reasoning behind a standard of approximately one-quarter wavelength is set forth in K. Pohlmann, *The Compact Disc Handbook*, 2d ed. (1992), an accepted reference on CD design. At pages 55–56, Prof. Pohlmann describes the generally accepted view of the operation of the light-readable information recording system in which the pit depth/bump height is preferably maintained near one-quarter of the wavelength of the light:

"Light striking land thus travels at a distance one-half the wavelength (one-quarter plus one-quarter) further than light striking a bump. This creates a phase difference of one-half wavelength between the part of the beam reflected from the bump and the part reflected from the surrounding land . . . . The phase difference causes the two parts of the beam to destructively interfere with and cancel each other, forming a diffractive pattern. In short, a bump disperses light, reducing the intensity of the reflected light."

This reduced intensity stands in sharp contrast to the reflection of virtually all of the light from the land, enabling the optical reader beneath the medium to detect the point of changeover from bump to land. Indeed, the greater the intensity difference, the easier it becomes for the optical reader to detect the changeover. Thus, Philips recommends a pit depth equal to one-quarter wavelength to achieve maximum diffraction efficiency.

In light of this accepted view of the method of operation of a light-readable information recording system, it stands to reason that a light-readable disc utilizing a pit depth/bump height of one-half the wavelength of the laser light being used would be inoperable. Viewed again from the perspective of an optical reader beneath the medium, light striking land would travel one full wavelength (one-half plus one-half) farther than light striking a bump. This would place the part of the beam reflected from the bump and the part reflected from the surrounding land in perfect phase, yielding no destructive interference and, consequently, no difference in light intensity. In such event, an optical reader would be completely unable to differentiate between bumps and lands and thereby incapable of retrieving any data.

Unexpectedly and completely contrary to the conventional view, it has been determined that, by designing the pit depth/bump height to be approximately one-half of the wavelength of the laser light source, an improved light-readable recording disc can be achieved. Not only has such a disc been found to be operable, but it has been determined that the intensity difference between the bump and land areas detected by an optical reader is actually greater than for the one-quarter wavelength pit previously thought to be optimal.

In view of the foregoing, it is an object of this invention to provide a light-readable information recording disc that is easier to read, which can thereby reduce the cost and complication of optical reading devices.

It is another object of this invention to provide an improved light-readable information recording disc which, by virtue of the stronger signal intensity difference that it generates, will provide for greater tolerance in the manufacturing of such discs.

SUMMARY OF THE INVENTION

These and other objects of the invention are accomplished in accordance with the principles of the invention by providing light-readable information recording media utilizing a pit/bump and land structure, such as that generally shown in Kramer U.S. Pat. No. 5,068,846, in which the pit depth/bump height is controlled to approximate one-half the wavelength of the light striking the surface of this structure.

It will be readily recognized that the exact configuration of the disc-shaped recording media is not limited to that disclosed in the Kramer reference. For example, a disc in which the optical structure is exposed to the air, such that the laser light strikes a reflective surface directly, would also benefit from the improved pit depth/bump height of the present invention. In that circumstance, the pit depth/bump height would be controlled to approximate one-half the wavelength of such laser light in air.

Similarly, it is of no importance to the invention whether pits or bumps are utilized along with lands in the optical storage structure. The unexpected and improved results are achieved by controlling the depth or height, respectively, of such structures to approximate one-half the wavelength of the light as it strikes the surface of the optical storage structure.

Further features of the invention, its nature and various advantages will be more apparent from the accompanying drawings and the following detailed description of the preferred embodiment.

DETAILED DESCRIPTION OF THE PREFERRED EMBODIMENT

Figure 1:
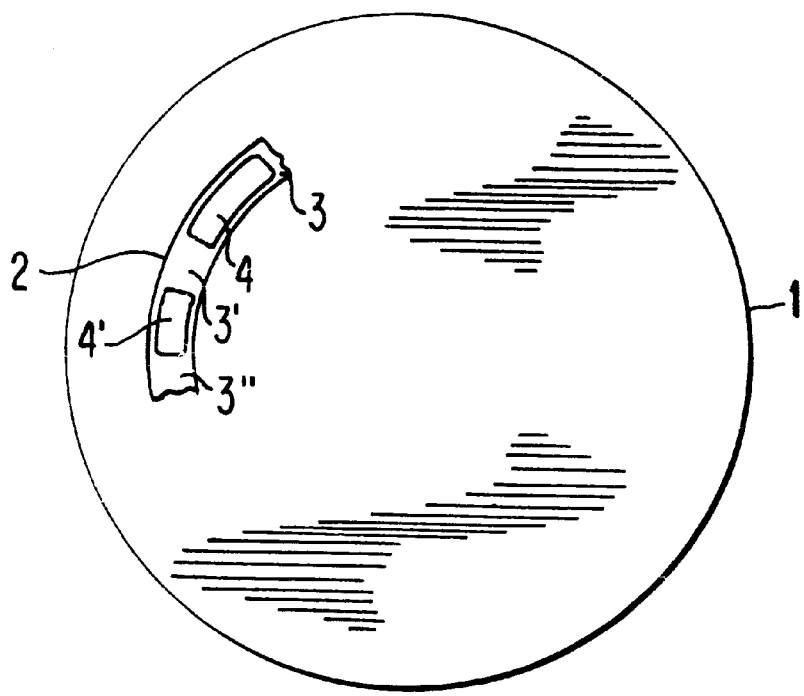
FIG. 1 is a simplified view of a light-readable information recording disc, providing an amplified view of one path of optically recorded information.

FIG. 1 depicts a light-readable information recording disc 1, as viewed from below. Illustrated is a greatly magnified section of one path of optically recorded information 2, in which land areas 3, 3' and 3" and bumps 4 and 4' are depicted.

Figure 2:
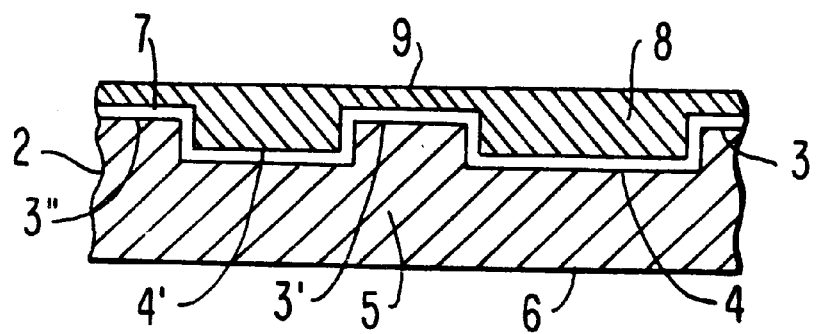
FIG. 2 is a cross-sectional view of this light-readable information recording disc constructed to embody the improvement of this invention, shown along the path of the recorded information.

FIG. 2 provides a cross-sectional view along the length of this magnified section of optically recorded information 2. A transparent material 5, preferably polycarbonate (although materials such as polymethyl methacrylate and photo polymer have also been used), forms the base of the disc 1, with a substantially planar lower surface 6. The top surface of the transparent material 5 is characterized by a series of land areas 3, 3' and 3", separated by bumps 4 and 4', which, when viewed in cross-section, appear to be pits in the top surface of the transparent material 5. Adherent to the land areas 3, 3' and 3" and the bumps 4 and 4' along the top surface of the transparent material 5 is a thin layer of reflective material 7.

Although more costly materials, such as gold or silver, would yield a longer life with better reflectivity, aluminum is typically used as the reflective material 7. Atop this reflective material 7 is placed a protective layer 8, preferably lacquer, which is provided unevenly so as to provide a substantially planar top surface 9 of the light-readable information recording disc 1. Labelling or other information may be placed upon this top surface 9.

Although the exact size and dimensions of the light-readable information recording disc 1 are a matter of choice, the most common disc 1 in commercial use today is typically 120 millimeters in diameter and 1.2 millimeters thick. The layer of reflective material 7 is preferably about 70 nanometers thick, while the protective layer 8 ranges between 10 and 30 micrometers.

Each of these dimensions, however, is independent of the height of bumps 4 and 4'. As is further shown in FIG. 2, a light source 10 is provided beneath the substantially planar lower surface 6 of the light-readable information recording disc 1. In general commercial use today, the light source 10 is a laser operating at a wavelength of 780 nanometers in air. The type of light source 10 and its operating wavelength are, however, matters of choice.

In accordance with the present invention, the operating wavelength of the light source 10 determines the height of bumps 4 and 4'. This height is controlled to approximate one-half the wavelength of the light from light source 10 within the transparent material 5. Since the refractive index of the preferred polycarbonate is 1.55, the wavelength of light from a light source 10 operating at a wavelength of 780 nanometers in air would be approximately 503 nanometers within the transparent material. As a result, the preferred height of bumps 4 and 4' is approximately 252 nanometers.

Efforts to make a light-readable information recording disc 1 in accordance with this invention have yielded successful audio CDs, contrary to expectations. Moreover, measurement of the light intensity differences detected between lands and bumps has yielded surprising and improved results. The differences in light intensity between lands and bumps for the shortest standardized bump length, referred to in the art as "T3," in a disc of the present invention were compared with those for a typical commercial audio CD. Results were plotted on a Tektronix TDS 540 four-channel digitizing oscilloscope. Utilizing a 780 nanometer laser directed into a polycarbonate disc substrate, a T3 bump 259 nanometers in height yielded an intensity difference of 1.064 V. When a commercial audio CD, also utilizing a polycarbonate substrate, was tested under the same conditions, a T3 bump measured at 114 nanometers in height yielded an intensity difference of only 0.952 V.

Since the accepted view of the operation of light-readable information recording systems suggests that such operation should be optimized when the reflected light is perfectly out of phase, it was decided also to test a light-readable information recording disc with a T3 bump height of approximately three-quarters of the wavelength of light—which should also yield high destructive interference resulting from the one and one-half extra wavelength distance which light reflected from lands would have to travel.

Once again, the differences in light intensity between lands and T3 bumps were plotted on the Tektronix TDS 540 four-channel digitizing oscilloscope. Utilizing the same 780 nanometer laser light source directed into a disc with a polycarbonate substrate, a T3 bump 396 nanometers in height yielded an intensity difference of 0.956 V—much closer to the intensity difference seen in the commercial audio CD than to that yielded by the disc of the present invention.

Numerous efforts have been undertaken to understand and/or explain the unexpected and improved results obtained by controlling pit height to approximately one-half the wavelength of light. None have borne fruit.

Nonetheless, the improved results, as noted above, promise substantial savings in the design and manufacture of less sensitive and less costly light-reading systems, as well as in disc manufacturing. Since a higher intensity signal difference is generated, manufacturing tolerances can be relaxed without sacrificing quality in the output and reading of data—leading to higher yields and lower costs.

It will be understood that the foregoing is only illustrative of the principles of this invention, and that various modifications can be made by those skilled in the art without departing from the scope and spirit of the invention. For example, structures can be made utilizing pit depths controlled to approximately one-half of the wavelength of the light rather than bumps 4 and 4' as specifically described above. Similarly, the wavelength of the light source 10 utilized is purely a matter of choice, as is the specific transparent material 5 to be used. Nor does the light source 10 need to be directed through any transparent material 5, since operation in air is feasible with readily apparent modifications.

The invention claimed is:

1. An information recording disc read by reflected light comprising an optical data storage structure including bumps and lands, in which the height of said bumps is controlled to approximate one-half of the wavelength of the light to be read striking said optical storage structure.

2. An information recording disc read by reflected light comprising an optical data storage structure including pits and lands, in which the depth of said pits is controlled to approximate one-half of the wavelength of the light to be read striking said optical storage structure.

3. A light-readable information recording disc comprising:
   a transparent substrate having one substantially planar surface and a second surface opposite to said first surface, said second surface formed as a data storage structure including bumps and lands, in which the height of said bumps is controlled to approximate one-half of the wavelength of the light to be read striking said optical storage structure; and
   a light-reflecting coating on said second surface for reflecting said light passed through said transparent substrate, said coating conforming to the contours of said second surface so that said light is reflected back through the transparent substrate in accordance with the information recorded by means of said bumps and lands.

4. The light-readable information recording disc defined in claim 3 wherein said transparent substrate is selected from the group consisting of polymethyl methacrylate, photo polymer and polycarbonate.

5. The light-readable information recording disc defined in claim 3 wherein said light-reflecting coating is selected from the group consisting of gold, silver and aluminum.

6. A light-readable information recording disc comprising:
   a transparent substrate having one substantially planar surface and a second surface opposite to said first surface, said second surface formed as a data storage structure including pits and lands, in which the depth of said pits is controlled to approximate one-half of the wavelength of the light to be read striking said optical storage structure; and
   a light-reflecting coating on said second surface for reflecting said light passed through said transparent substrate, said coating conforming to the contours of said second surface so that said light is reflected back through the transparent substrate in accordance with the information recorded by means of said pits and lands.

7. The light-readable information recording disc defined in claim 6 wherein said transparent substrate is selected from the group consisting of polymethyl methacrylate, photo polymer and polycarbonate.

8. The light-readable information recording disc defined in claim 6 wherein said light-reflecting coating is selected from the group consisting of gold, silver and aluminum.

9. A light-readable information recording disc comprising:
   a transparent substrate having one substantially planar surface and a second surface opposite to said first surface, said second surface formed as a data storage structure including bumps and lands, in which the height of said bumps is controlled to approximate one-half of the wavelength of the light to be read striking said optional storage structure;
   a first light-reflecting coating on said second surface for reflecting said light passed through said transparent substrate, said first coating conforming to the contours of said second surface so that said light is reflected back through the transparent substrate in accordance with the information recorded by means of said bumps and lands; and
   a second protective coating having one surface conforming to the contours of said first light-reflecting coating and a second surface opposite to said first surface being substantially planar.

10. The light-readable information recording disc defined in claim 9 wherein said transparent substrate is selected from the group consisting of polymethyl methacrylate, photo polymer and polycarbonate.

11. The light-readable information recording disc defined in claim 9 wherein said first light-reflecting coating is selected from the group consisting of gold, silver and aluminum.

12. The light-readable information recording disc defined in claim 9 wherein said second protective coating is lacquer.

13. A light-readable information recording disc comprising:
   a transparent substrate having one substantially planar surface and a second surface opposite to said first surface, said second surface formed as a data storage structure including pits and lands, in which the depth of said pits is controlled to approximate one-half of the wavelength of the light to be read striking said optional storage structure; and
   a first light-reflecting coating on said second surface for reflecting said light passed through said transparent substrate, said first coating conforming to the contours of said second surface so that said light is reflected back through the transparent substrate in accordance with the information recorded by means of said pits and lands.

14. The light-readable information recording disc defined in claim 13 wherein said transparent substrate is selected from the group consisting of polymethyl methacrylate, photo polymer and polycarbonate.

15. The light-readable information recording disc defined in claim 13 wherein said first light-reflecting coating is selected from the group consisting of gold, silver and aluminum.

16. The light-readable information recording disc defined in claim 13 wherein said second protective coating is lacquer.

17. A light-readable information recording disc comprising a light-reflecting surface formed as a data storage structure including bumps and lands, in which the height of said bumps is controlled to approximate one-half of the wavelength of the light to be read striking said light-reflecting surface.

18. The light-readable information recording disc defined in claim 17 wherein said light-reflecting surface is selected from the group consisting of gold, silver and aluminum.

19. A light-readable information recording disc comprising a light-reflecting surface formed as a data storage structure including pits and lands, in which the depth of said pits is controlled to approximate one-half of the wavelength of the light to be read striking said light-reflecting surface.

20. The light-readable information recording disc defined in claim 19 wherein said light-reflecting surface is selected from the group consisting of gold, silver and aluminum.

21. A system for optically reading stored information comprising:
an information recording disc having one substantially planar surface and a second surface formed as a data storage structure including bumps and lands with a light-reflecting coating adherent to the contours of said second surface, in which the height of said bumps is controlled to approximate one-half of the wavelength of the light to be read striking said data storage structure;
a light source of predetermined wavelength directed at said data storage structure, such that light generated thereby is reflected by the light-reflecting coating in accordance with the information recorded by means of said bumps and lands; and
an optical reading structure for detection of said reflected light and reading of the information recorded by means of said bumps and lands.

22. The system for optically reading stored information defined in claim 21 wherein said light-reflecting coating on the information recording disc is selected from the group consisting of gold, silver and aluminum.

23. A system for optically reading stored information comprising:
an information recording disc having one substantially planar surface and a second surface formed as a data storage structure including pits and lands with a light-reflecting coating adherent to the contours of said second surface, in which the height of said pits is controlled to approximate one-half of the wavelength of the light to be read striking said data storage structure;
a light source of predetermined wavelength directed at said data storage structure, such that light generated thereby is reflected by the light-reflecting coating in accordance with the information recorded by means of said pits and lands; and
an optical reading structure for detection of said reflected light and reading of the information recorded by means of said pits and lands.

24. The system for optically reading stored information defined in claim 23 wherein said light-reflecting coating on the information recording disc is selected from the group consisting of gold, silver and aluminum.

25. A system for optically reading stored information comprising:
an information recording disc having one substantially planar surface and a second surface formed as a data storage structure including bumps and lands, with a first light-reflecting coating adherent to the contours of said second surface and a second protective coating having one surface conforming to the contours of said first light-reflecting coating and a second substantially planar surface opposite to said first surface, in which the height of said bumps is controlled to approximate one-half of the wavelength of the light to be read striking said data storage structure;
a light source of predetermined wavelength directed at said data storage structure, such that light generated thereby is reflected by the first light-reflecting coating in accordance with the information recorded by means of said bumps and lands; and
an optical reading structure for detection of said reflected light and reading of the information recorded by means of said bumps and lands.

26. The system for optically reading stored information defined in claim 25 wherein said first light-reflecting coating on the information recording disc is selected from the group consisting of gold, silver and aluminum.

27. The system for optically reading stored information defined in claim 25 wherein said second protective coating on the information recording disc is lacquer.

28. A system for optically reading stored information comprising:
an information recording disc having one substantially planar surface and a second surface formed as a data storage structure including pits and lands, with a first light-reflecting coating adherent to the contours of said second surface and a second protective coating having one surface conforming to the contours of said first light-reflecting coating and a second substantially planar surface opposite to said first surface, in which the height of said pits is controlled to approximate one-half of the wavelength of the light to be read striking said data storage structure;
a light source of predetermined wavelength directed at said data storage structure, such that light generated thereby is reflected by the first light-reflecting coating in accordance with the information recorded by means of said pits and lands; and
an optical reading structure for detection of said reflected light and reading of the information recorded by means of said pits and lands.

29. The system for optically reading stored information defined in claim 28 wherein said first light-reflecting coating on the information recording disc is selected from the group consisting of gold, silver and aluminum.

30. The system for optically reading stored information defined in claim 28 wherein said second protective coating on the information recording disc is lacquer.

31. A system for optically reading stored information comprising:
an information recording disc comprising a light-reflecting surface formed as a data storage structure including bumps and lands, in which the height of said bumps is controlled to approximate one-half of the wavelength of the light to be read striking said data storage structure;
a light source of predetermined wavelength directed at said data storage structure, such that light generated thereby is reflected by the light-reflecting surface in accordance with the information recorded by means of said bumps and lands; and an optical reading structure for detection of said reflected light and reading of the information recorded by means of said bumps and lands.

32. The system for optically reading stored information defined in claim 31 wherein said light-reflecting surface on the information recording disc is selected from the group consisting of gold, silver and aluminum.

33. A system for optically reading stored information comprising:

an information recording disc comprising a light-reflecting surface formed as a data storage structure including pits and lands, in which the height of said pits is controlled to approximate one-half of the wavelength of the light to be read striking said data storage structure;

a light source of predetermined wavelength directed at said data storage structure, such that light generated thereby is reflected by the light-reflecting surface in accordance with the information recorded by means of said pits and lands; and an optical reading structure for detection of said reflected light and reading of the information recorded by means of said pits and lands.

34. The system for optically reading stored information defined in claim 33 wherein said light-reflecting surface on the information recording disc is selected from the group consisting of gold, silver and aluminum.

\* \* \* \* \*